US008629992B2

(12) United States Patent
Kawaura

(10) Patent No.: US 8,629,992 B2
(45) Date of Patent: Jan. 14, 2014

(54) PRINTING CONTROL APPARATUS AND METHOD, AND PRINTING SYSTEM

(75) Inventor: Toshinori Kawaura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1383 days.

(21) Appl. No.: 12/018,257

(22) Filed: Jan. 23, 2008

(65) Prior Publication Data

US 2008/0180715 A1    Jul. 31, 2008

(30) Foreign Application Priority Data

Jan. 29, 2007    (JP) .................................. 2007-018500

(51) Int. Cl.
*H04N 1/32* (2006.01)

(52) U.S. Cl.
USPC ........................................ 358/1.13; 358/1.15

(58) Field of Classification Search
USPC ........ 358/1.13, 1.1, 1.9, 2.1, 3.01, 3.21, 3.23, 358/3.24, 1.15, 501, 518, 523
See application file for complete search history.

(56) References Cited

U.S. PATENT DOCUMENTS

| 5,774,146 | A  | * | 6/1998 | Mizutani | 347/43 |
| 6,097,497 | A  | * | 8/2000 | McGraw | 358/1.12 |
| 6,940,612 | B1 | * | 9/2005 | Murai | 358/1.1 |
| 2004/0012804 | A1 |   | 1/2004 | Kasuga | 358/1.13 |
| 2005/0111015 | A1 |   | 5/2005 | Tsujimoto | 358/1.9 |
| 2006/0024073 | A1 | * | 2/2006 | Murakami et al. | 399/44 |

FOREIGN PATENT DOCUMENTS

| JP | 11-175284 | 7/1999 | ............... G06F 3/12 |
| JP | 2002-84433 | 3/2002 | |
| JP | 2003-305923 | 10/2003 | |
| JP | 2004-54417 | 2/2004 | |

* cited by examiner

*Primary Examiner* — Thomas D Lee

(74) *Attorney, Agent, or Firm* — Fitzpatrick, Cella, Harper & Scinto

(57) ABSTRACT

Provided is a printing system in which it is possible to obtain an appropriate printed result from a printing apparatus even if the type of printing medium that has been set by a printer driver user interface and the type of printing medium loaded in the printing apparatus differ. The printing apparatus has a sensor for sensing the type of printing medium loaded. In the printing system, which requires that a printing parameter be transmitted from the printer driver to the printing apparatus, a printing medium is selected by a language monitor based upon the type of printing medium loaded in the printing apparatus and a print quality selected by the printer driver user interface. The selected printing parameter is transmitted to the printing apparatus together with print data.

12 Claims, 16 Drawing Sheets

FIG. 9

| PARAMETER ID | Media Type | Print Quality | PARAMETER |
|---|---|---|---|
| 1 | PLAIN PAPER | High | A |
| 2 | PLAIN PAPER | Standard | B |
| 3 | PLAIN PAPER | Fast | C |
| 4 | PHOTO PAPER | High | D |
| 5 | PHOTO PAPER | Standard | E |
| 6 | MATTE PAPER | High | F |
| 7 | MATTE PAPER | Standard | G |
| ... | ... | ... | ... |

FIG. 10

| PARAMETER ID | Media Type | Print Quality | PARAMETER |
|---|---|---|---|
| 2 | PLAIN PAPER | Standard | B' |
| 3 | PLAIN PAPER | Fast | C' |
| 4 | PHOTO PAPER | High | D' |
| 6 | MATTE PAPER | High | F' |
| ... | ... | ... | ... |

902

PRINTING CONTROL APPARATUS AND METHOD, AND PRINTING SYSTEM

BACKGROUND OF THE INVENTION

1. Field of the Invention

The present invention relates to a printing system and to a printing control apparatus, such as a personal computer, and a printing apparatus that constructs this printing system.

2. Description of the Related Art

There are printing systems in which a host computer (referred to simply as a computer below) converts data created by an application or the like to bitmap data in a YMCK calorimetric system, etc., capable of being printed by a printing apparatus (referred to simply as a printer below), and then transmits the bitmap data to the printer. The computer in this printing system subjects input image data to a color conversion and quantization processing to convert the input image data to binary data or N-value data, which has a small number of gray levels in comparison with the original image, capable of being printed by the printer. In the course of this conversion processing, use is made of a conversion table to which reference is had in order to convert the calorimetric system of the original image created by the application or the like to the calorimetric system of the printer, and a conversion table to which reference is had in order to execute quantization processing.

By way of example, it is required that image data represented by luminance signals R (red), G (green) and B (blue) undergo a color conversion to image data represented by density signals Y (yellow), M (magenta) and C (cyan) used by the printer. There are many cases where YMC further include a K (black) component in accordance with the functions of the printer. In the color conversion, first the RGB data is subjected to a color correction (eight bits per each of R, G, B to eight bits per each of R, G, B). Next, the color conversion is performed (eight bits per each of R, G, B to eight bits per each of C, M, Y, K). Next, a tone correction is applied (eight bits per each of C, M, Y, K to eight bits per each of C, M, Y, K). Finally, quantization processing is executed (eight bits per each of C, M, Y, K to one bit per each of C, M, Y, K).

In these conversion or correction operations, use is made of conversion tables prepared in advance and stored in the computer. The conversion tables used differ depending upon the type of printing medium used in printing and upon the designated print quality. Consequently, the number of each of these conversion tables is equivalent to the number of combinations of types of printing media and print qualities.

On the other hand, there are also printing systems in which the computer transmits multi-valued image data to the printer and the data is converted by the printer to data suited to the printer. The image data that is sent from the personal computer to the printer in this printing system is image data in the bitmap format in the RGB calorimetric system (this data will be referred simply as "bitmap data"). Since bitmap data generally has a large data size, it is transmitted to the printer after being compressed in a format compliant with JPEG or the like. The above-described conversion processing is executed using a conversion table that is being held in the computer.

In general, an inexpensive printer will not have a large storage capacity in order to reduce cost. Often a printer with a small storage capacity cannot hold printing parameters such as conversion tables corresponding to all combinations of types of printing media and printing qualities. Furthermore, there are also cases where conversion tables held by a printer have been reduced in size and simplified, as by reducing the number of grid points. If use is made of a conversion table having few grid points, an input value corresponding to a grid point is converted to an output value stored in association with this grid point. However, when an input value that does not correspond to a grid point is converted, the output value that corresponds to this input value is calculated by an interpolation of the conversion table and this value is used in the conversion. This means that printed results having a higher image quality can be obtained by forming an image using a conversion table having many grid points rather than a simple conversion table held by a printer.

Accordingly, in order to obtain a high image quality with a printer having a small storage capacity, a technique in which printing parameters such as conversion tables suited to printing are transmitted from a computer to a printer together with print data has been proposed (e.g., Japanese Patent Laid-Open No. 11-175284). This cited patent document describes a printing control apparatus in which printing parameters conforming to the type of printing medium and print quality designated by a printing setting unit (referred to as a "printer driver user interface" below) are transmitted to a printer upon being attached to multi-valued data. In accordance with this technique, the conversion tables being held by the printer are only those that conform to the designated type of printing medium and print quality. As a result, high-quality printing can be expected even with a printer having a small storage capacity.

Furthermore, the printer is equipped with a mechanism (referred to as a "medium sensor" below) for sensing the type of printing medium. If the type of printing medium actually loaded in the printer is sensed and the printer driver is notified of the type, then it will be possible for the printer driver to select printing parameters that conform to the reported information concerning the type of printing medium and the print quality.

However, there are instances where the user replaces the printing medium with another after the printer has acquired the type of printing medium from the printer. In such case there will be a discrepancy between the type of printing medium used and the type of printing medium to which reference is had in order to select the printing parameters. As a consequence, printed results having a high quality cannot be obtained.

SUMMARY OF THE INVENTION

Accordingly, the present invention has been devised in view of the prior art described above and its object is to provide a printing control apparatus and method and a printing system whereby printed results having a high quality can be obtained by selecting a printing parameter conforming to the type of printing medium loaded in a printing apparatus.

According to the present invention, the foregoing object is attained by providing a printing control apparatus connected to a printing apparatus having a unit for sending medium information indicating a type of a printing medium acquired in response to a medium type acquisition request from the printing control apparatus, and a unit for generating binary print data using a printing parameter that has been associated with multi-valued print data that has been received, and performing printing based upon the binary print data generated, the apparatus comprises:

a storage unit, configured to store a plurality of printing parameters conforming to types of printing media;

a print data generating unit responsive to an application data output request, which is input by a user, configured to generate multi-valued print data that is based upon the application data; and a transmission control unit, configured to, upon accepting the multi-valued print data generated by the print data generating unit, issue the medium type acquisition request to the printing apparatus, receive the medium information that is in response to the medium detection request, select a printing parameter, which conforms to the type of printing medium indicated by the medium information acquired, from the plurality of printing parameters that have been stored in the storage unit, and transmit the selected printing parameter to the printing apparatus in association with the multi-valued print data.

By utilizing the present invention, it is possible to construct a printing system in which optimum printed results can be obtained in a multi-valued input printer having a function for sensing the type of printing medium.

Further features of the present invention will become apparent from the following description of exemplary embodiments with reference to the attached drawings.

BRIEF DESCRIPTION OF THE DRAWINGS

FIG. 9 is a table illustrating the state of management of printing parameters held within a printing control apparatus in an embodiment of the present invention;

FIG. 10 is a table illustrating the state of management of printing parameters held within a printing apparatus in an embodiment of the present invention;

DESCRIPTION OF THE EMBODIMENTS

Preferred embodiments of the present invention will now be described in detail with reference to the drawings.

[First Embodiment]
<Structure of Printing Apparatus>

Figure 1:
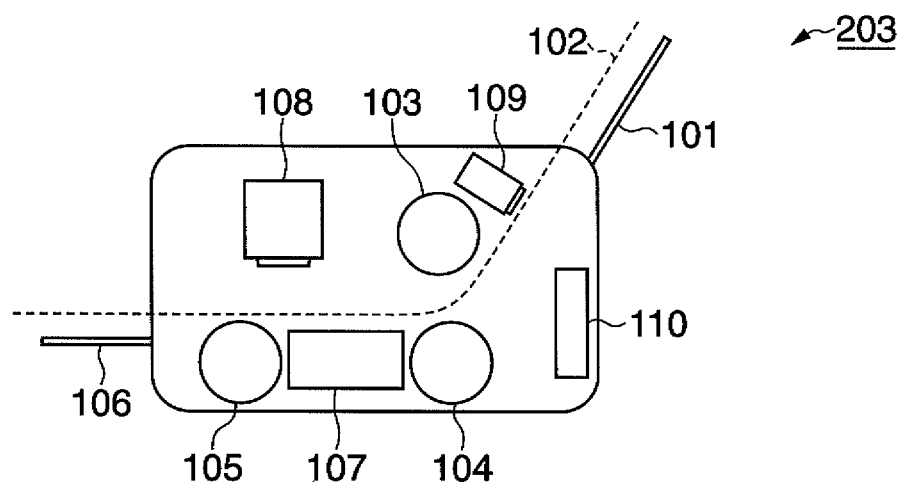
FIG. 1 is a diagram illustrating the structure of a printing apparatus in an embodiment of the present invention.

FIG. 1 is a diagram illustrating the structure of a printing apparatus 203 according to an embodiment of the present invention. As shown in FIG. 1, a printing medium used in printing is loaded in an automatic sheet feeder 101. The printing medium is in the form of individual sheets and a plurality of these sheets can be loaded in the automatic sheet feeder 101, in which case the sheets of the loaded printing medium are fed from the top one sheet at a time. The printing medium loaded in the automatic sheet feeder 101 traverses a path 102 along which the medium is fed, conveyed, subjected to image formation and finally ejected from the apparatus. The topmost sheet of the printing medium loaded in the automatic sheet feeder 101 is fed to a downstream conveyance mechanism by a feed roller 103. A conveyance roller 104 and discharge roller 105 cooperate with other rollers combined therewith in order to convey the printing medium along the path 102.

A drop tray 106 holds the printing medium that has been ejected from the printer by the discharge roller 105. A platen 107 supports the printing medium during the conveyance thereof. A printhead 108 discharges ink droplets onto the printing medium supported on the platen 107, thereby forming an image on the printing medium. The structure of the printhead 108 differs depending upon the types and numbers of inks used. A printing medium sensor 109 reads the type of the topmost printing medium loaded in the automatic sheet feeder 101. By way of example, types of printing media include coated paper (photo paper), plain paper, postcard and transparent plastic sheet, etc. The printing medium sensor 109 has light-emitting and light-receiving sections in this embodiment. Of course, if the type of medium can be sensed, any type of sensor will suffice. A controller 110 controls the overall printing apparatus, for example, processes information from a computer and controls a print engine.

Figure 3:
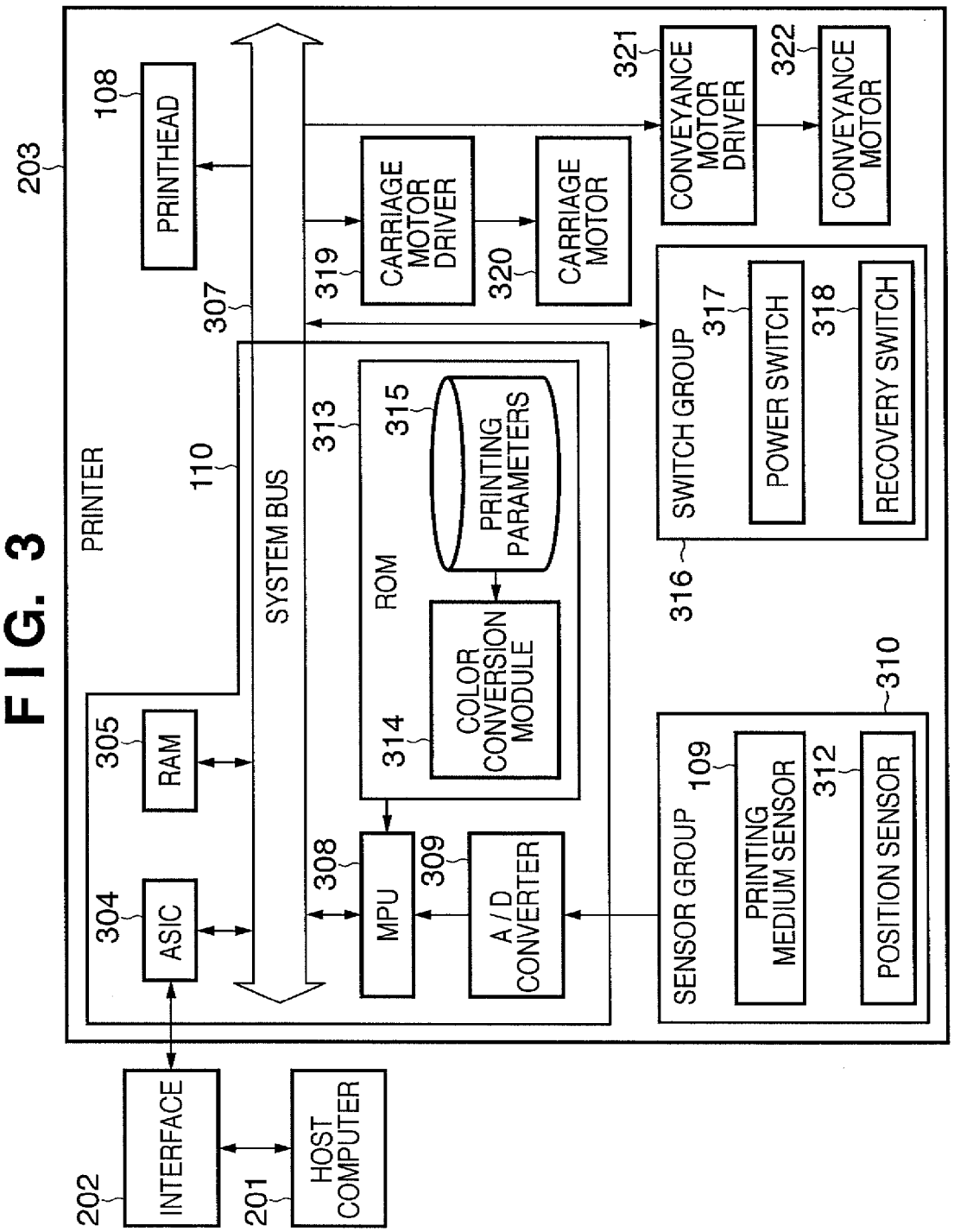
FIG. 3 is a block diagram illustrating the structure of a printing apparatus in an embodiment of the present invention.

FIG. 3 is a block diagram illustrating the structure of the printing apparatus 203. As illustrated in FIG. 3, the printing apparatus (printer) 203 has the controller 110, which includes an MPU 308, a ROM 313 that stores programs, required tables and other permanent data, and a RAM 305. The controller 110 of the printing apparatus 203 further includes an application-specific integrated circuit (ASIC) 304 that generates control signals for controlling a carriage motor 320, a conveyance motor 322 and the printhead 108. The controller 110 further includes a system bus 307 for sending and receiving data by interconnecting the RAM 305, which provides an area for expanding image data and a work area for executing programs, the MPU 308 and ASIC 305. The controller 110 also has an A/D converter 309 for converting an analog signal from a sensor group 310 to a digital signal and supplying the digital signal to the MPU 308.

A switch group 316 comprises switches for receiving command inputs from an operator, the switches including a power switch 317 as well as a recovery switch 318 for commanding start-up of processing (recovery processing) in order to maintain the ink discharge capability of the printhead 108 in a favorable state. The sensor group 310 has various sensors for sensing the status of the apparatus. These sensors include a position sensor 312, which is constituted by a photocoupler or the like for sensing the home position of the printhead 108, and the printing medium sensor 109 for discriminating the type of printing medium loaded in the printing apparatus 203.

A carriage driver 319 drives a carriage motor 320. A conveyance motor driver 321 drives the conveyance motor 322 for conveying the printing medium.

When a printing scan is performed by the printhead 108, the ASIC 304 transfers driving data (DATA), which is for driving the printing elements (discharge heaters), to the printhead while directly accessing the storage area of the ROM 305.

Figure 2:
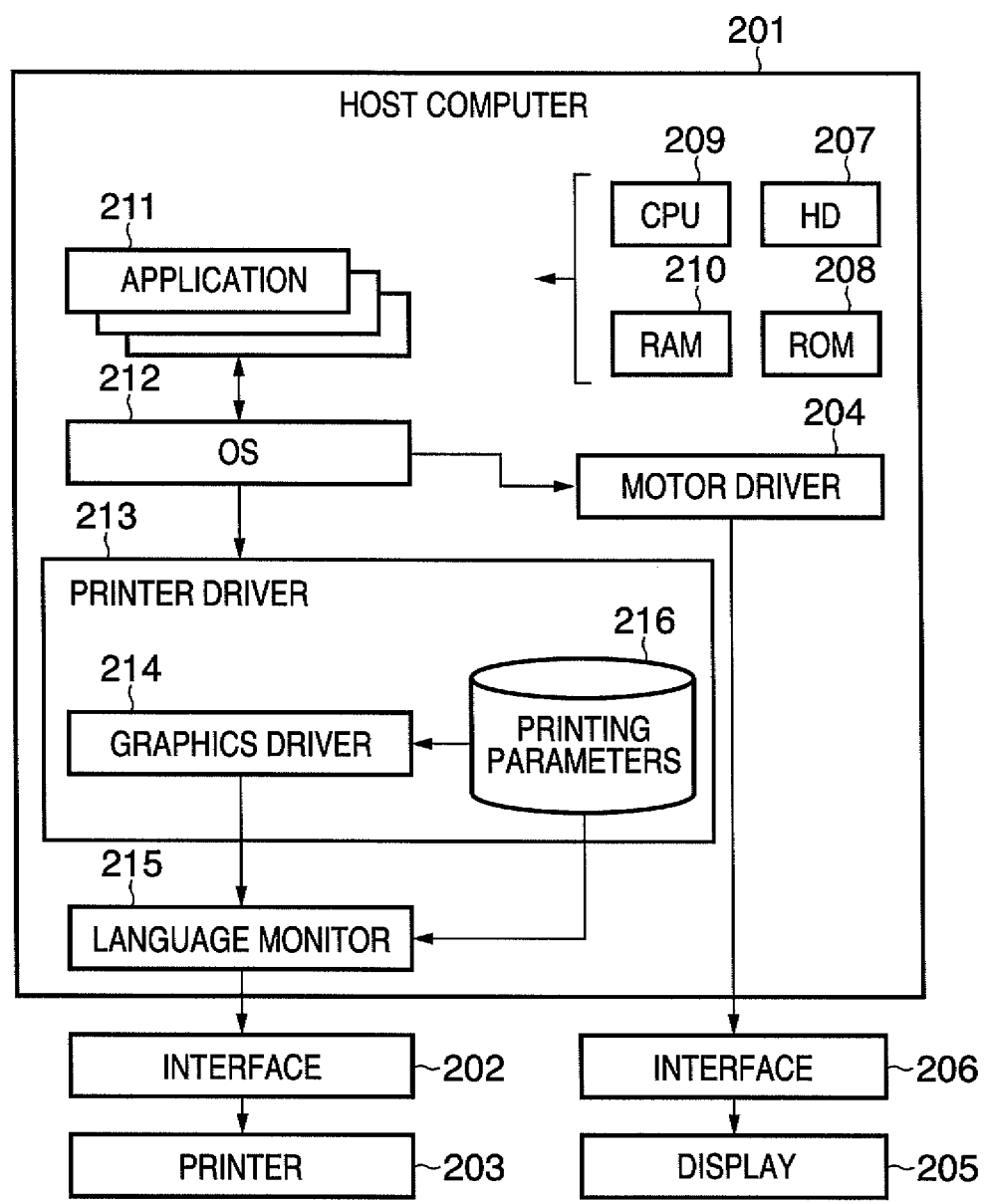
FIG. 2 is a block diagram illustrating the structure of an information processing apparatus in an embodiment of the present invention.

In a case where the printing apparatus 203 is capable of receiving multi-valued data (i.e., is capable of printing such data), the received multi-valued data is converted to binary data by various color conversion modules 314 that have been stored in the ROM 313. The multi-valued data is print data in the bitmap format in the RGB calorimetric system, by way of example. Print quality, which has been set by a printer driver 213 in FIG. 2, is read from a print parameter that has been attached to print data transmitted from the computer. Furthermore, the type of printing medium is discriminated based upon a signal that is the result of sensing by the printing medium sensor 109. The color conversion module 314 selects a printing parameter, which conforms to the print quality and type of printing medium, from printing parameters 315 stored in the ROM 313 or from printing parameters received from a computer 201. The color conversion module 314 converts the multi-valued image data to binary data using the selected printing parameter. With regard to the printing parameters 315 being held by the printing apparatus 203, parameters used in image processing, such as a color conversion table, color correction table and quantization table, are formed into individual sets, and each set is stored in a form in which it is associated with print quality and type of printing medium (see FIG. 9). A specific identifier is assigned to one set. The same is true with regard to printing parameters 216 that have been stored in the computer 201. Accordingly, if printing parameters of identical content have been stored in the printing apparatus 203 and computer 201, these printing parameters will have the same identifiers as each other. The degree to which the printing parameters are identical, therefore, can be determined by referring to the identifiers. A plurality of sets of printing parameters associated with printing qualities and types of printing media have been stored.

Since the storage capacity of the printing apparatus 203 is small, there are cases where printing parameters conforming to printing qualities and types of printing media will not be included among the printing parameters 315. In such cases, corrections and conversions are carried out using printing parameters transmitted from the computer in association with multi-valued image data. In a case where the printing apparatus 203 performs a color conversion and color correction, the computer 201 may select a printing parameter conforming to print quality and type of printing medium from the stored printing parameters 216 and always transmit the printing parameter to the printing apparatus 203 along with the image data. Alternatively, it may be so arranged that information indicating a printing parameter that has been stored in the printing apparatus 203 is stored in the computer 201 beforehand and no transmission is made with regard to this printing parameter.

That is, there is also a case where printing parameters transmitted to the printing apparatus 203 along with image data include image quality information indicative of image quality, and further include conversion tables. For example, conversion tables include tables for applying a color correction to RGB image data, applying a color correction from RGB to YMCK, applying a color correction to YMCK image data and quantizing YMCK multi-valued image data. The controller 110 executes the color conversion, color correction and quantization of the received RGB data using the conversion tables included in the printing parameters associated with the received image data.

Upon receiving a medium detection request, which requests information (referred to as "medium information") indicating the type of printing medium, from the computer 201, the controller 110 decides the type of printing medium based upon a signal from the printing medium sensor 109 and transmits the information indicative of type of printing medium to the computer 201. By way of example, the printing medium sensor 109 may comprise an optical sensor for measuring the surface reflectivity of the printing medium. In this case, a signal value indicating the intensity of the light received by the printing medium sensor 109 is input to the controller 110. The controller 110 obtains the reflectivity of the medium surface based upon an already known value indicating the light intensity of the light-emitting element and the signal value indicating the intensity of light received by the light-receiving element and, using the reflectivity obtained, retrieves a previously registered table associated with the reflectivity and the type of printing medium. Information indicating the type of medium is transmitted from the controller 110 to the computer 201.

Furthermore, in a case where the printing apparatus 203 performs printing upon receiving bitmap image data in the YCMK calorimetric system, the controller 110 exercises control of discharge and discharge failure of ink from each nozzle of the printhead 108, controls the scanning of the printhead 108 and controls the conveyance of the printing medium. Since color conversion and correction are performed by the computer, the printing apparatus 203 does not execute this processing.

<Structure of Computer>

FIG. 2 is a block diagram representing the structure of the host computer 201 in this embodiment. The printing apparatus 203, such as an ink-jet printer, and a display 205 are connected to the computer 201 via a USB 2.0 interface 202 and a display-cable interface 206, respectively. The computer 201 is capable of running a variety of application software 211 such as a word processor, spreadsheet and Internet browser. The printer driver 213 creates print data by processing a group of various graphic commands, which are indicative of an output image, sent to an operating system 212 by the application software 211. Here the group of graphic commands refers to an image graphic command, a text graphic command and a graphics graphic command. A display driver 204 presents a display on a monitor 205 by processing the group of graphic commands issued by the application software 211.

The computer 201 includes various hardware that is capable of operating with this software, namely a central processing unit (CPU) 209, hard disk (HD) 207, random-access memory (RAM) 210 and read-only memory (ROM) 208. The above-mentioned software is stored on the hard disk 207 and is loaded in the RAM 210 at the time of execution.

The operating system 212 is the basic program of the computer 201. The operating system 212 has a function module (system spooler) that spools a set of graphic commands issued by the application software 211 for the purpose of outputting a page image. The specific example of the structure shown in FIG. 2 is, for example, a personal computer in which Microsoft's Windows (registered trademark) has been installed as the operating system 212. Furthermore, an application having the printing function of this computer is installed, the printing apparatus 203 is connected and the driver thereof is installed. This is one form for implementing the arrangement of FIG. 2.

Figure 4:
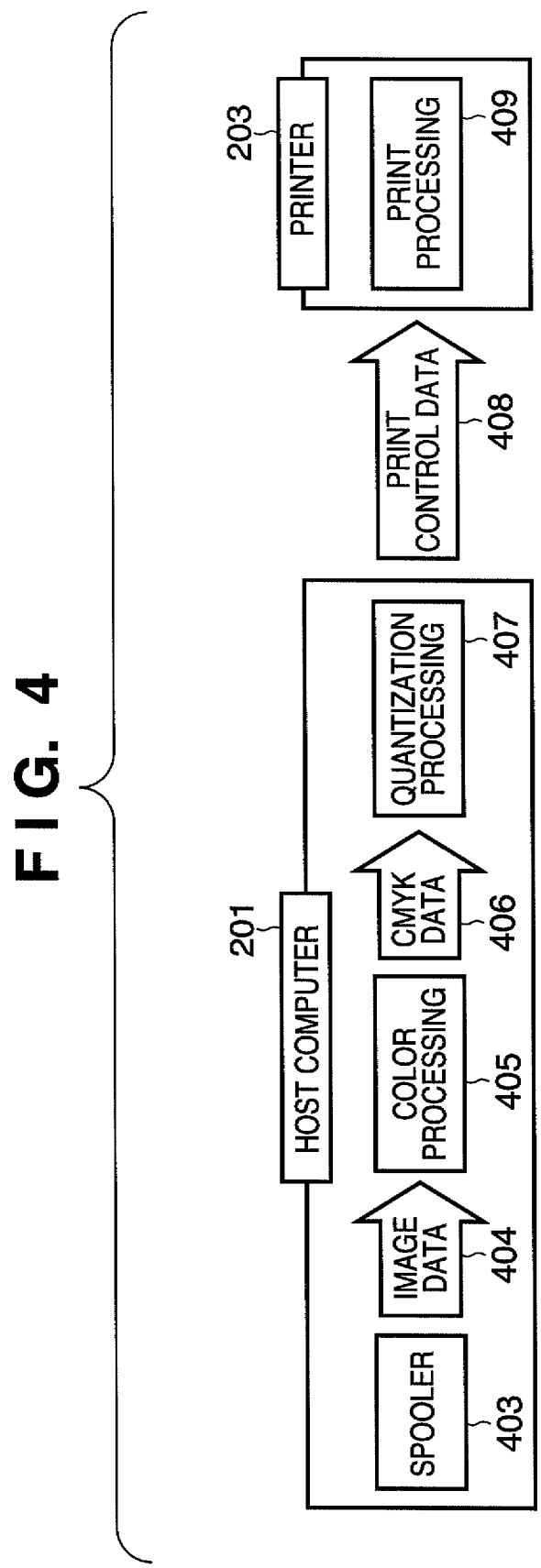
FIG. 4 is a diagram illustrating the flow of print data generation in an embodiment of the present invention.
Figure 5:
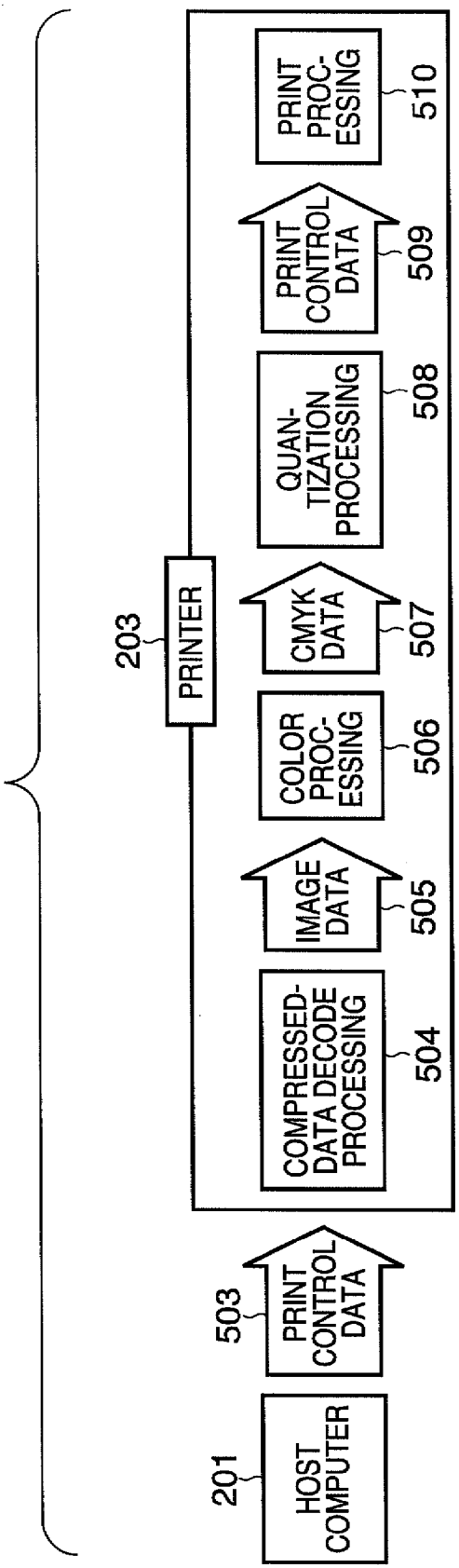
FIG. 5 is a diagram illustrating the flow of print data generation in an embodiment of the present invention.

The computer 201 creates output image data based upon application data created by the application software 211. The output image data includes text data classified into text such as characters, graphics data classified into graphics such as figures, and image data classified into natural images, etc. When output image data is printed out, the application software 211 issues a print output request to the operating system 212 in response to a print command (print request) from the user. At this time the application software 211 issues a group of graphic commands to the operating system 212, wherein the graphics data portion is constituted by the graphics graphic command, the text portion by the text graphic command and the image data portion by the image graphic command. This group of graphic commands is referred to as "output image data". The operating system 212 spools the group of graphic commands and issues a print request and the group of graphic command to the printer driver 213 corresponding to the printing apparatus 203. Using a graphics driver 214, the printer driver 213 processes the print request and group of graphic commands that have entered from the operating system 212 and creates print data capable of being printed by the printing apparatus 203. That is, in this embodiment, the graphics driver 214 corresponds to a print data generating unit that generates print data. For example, the printing apparatus 203 may be one that prints upon receiving an input of data which is binary bitmap image data in the YMCK colorimetric system (such data is referred to as "YMCK binary image data"). For such a printing apparatus, the graphics driver 214 generates YMCK image data as the print data based upon the group of graphic commands. Further, the printing apparatus 203 may be one that prints upon receiving an input of data which is multi-valued bitmap image data in the RGB calorimetric system (such data is referred to as "RGB binary image data"). For such a printing apparatus, the graphics driver 214 generates RGB multi-valued image data as the print data based upon the group of graphic commands. The print data created is transferred to the printing apparatus 203 successively by a language monitor 215. That is, the language monitor 215 corresponds to a transmission control unit in this embodiment. There are also cases where the data output by the language monitor 215 is referred to as "print control data", as illustrated in FIGS. 4 to 6. However, there are also instances where the format of the data that is input to the language monitor 215 is identical with the format of the data that is output. There are cases, however, where the content of the data is rewritten by the language monitor.

It should be noted that in Microsoft's Windows (registered trademark), a language monitor is a software module executed by a spool subsystem for outputting print data once the print data has been spooled. Usually the language monitor 215 is supplied by the vendor of the printer along with the printer driver 213. The language monitor 215 communicates with the printing apparatus connected to the computer by bi-directional communication compliant with IEEE 1284 or USB, etc., by way of example. As a result, the computer is capable of ascertaining completion of ejection of paper for a print job or error information generated within the printer. Information that has been sent back from the printer via the language monitor 215 is obtained by a software module referred to as "status display" (not shown), thereby enabling the computer to display status.

In a case where print data is transmitted to the printing apparatus 203 as binary data, the graphics driver 214 selects printing parameters, e.g., conversion tables, conforming to the type of printing medium and print quality selected by the printer driver user interface. The printer driver 213, which has been stored on the hard disk, holds the printing parameters 216 conforming to the type of printing medium and print quality. Further, the printing parameters 216 include also identifiers of the printing parameters being held by the printing apparatus 203. The graphics driver 214 converts the output image data to binary data using the selected printing parameters.

On the other hand, in a case where the printing apparatus 203 is capable of receiving print data as multi-valued data, the image data accepted by the printer driver 213 and the printing parameters selected by the language monitor are transmitted to the printing apparatus 203. In relation to printing parameters such as conversion tables being held by the printing apparatus 203, it is preferred that transmission of these printing parameters be avoided, as mentioned above. Processing for selecting appropriate printing parameters by the language monitor 215 will be described later.

<Generation of Print Control Data (Print Data)>

FIGS. 4 and 5 are diagrams illustrating the flow of generation of print control data in this embodiment. FIG. 4 illustrates the flow of processing in a case where the printing apparatus 203 performs printing upon receiving binary data, for example, binary bitmap data in the YMCK calorimetric system. A spooler 403 within the computer 201 delivers image data 404 to the printer driver 213. The graphics driver 214 applies color processing 405 to the image data 404 delivered from the spooler 403, thereby generating CMYK data 406. The graphics driver 214 generates print control data 408 from the CMYK data 406 by quantization processing 407.

Figure 6A:
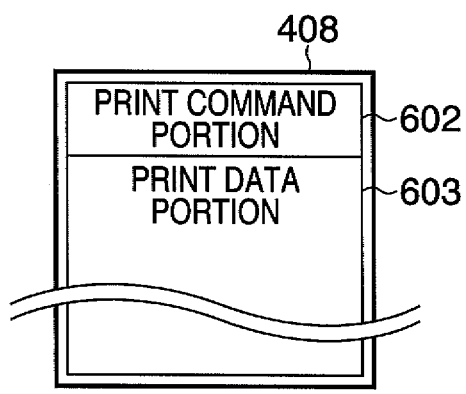
FIGS. 6A and 6B are diagrams illustrating the structure of print control data in an embodiment of the present invention.

The print control data 408 includes a print command portion 602 and a print data portion 603, as illustrated in FIG. 6A. The print command portion 602 includes information indicating a paper feed command and a setting of print quality, etc. The print data portion 603 includes binary image data in the YMCK calorimetric system obtained by converting image data to binary data. When such print control data 408 is input to the printing apparatus 203, the latter executes print processing 409.

Figure 6B:
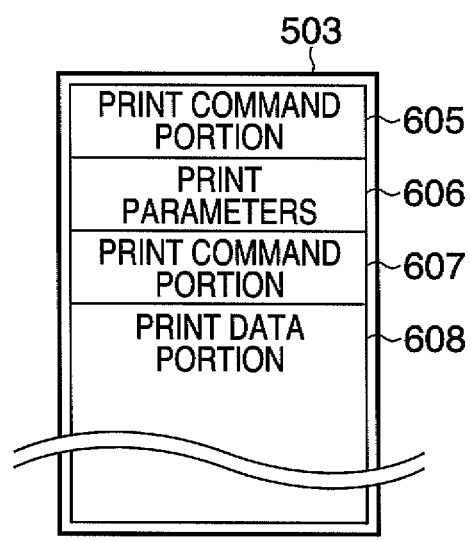

FIG. 5 illustrates the flow of processing in a case where the printing apparatus 203 performs printing upon receiving multi-valued data, for example, multi-valued bitmap data in the RGB calorimetric system. Print control data 503 that has been generated by the computer 201 is input to the printing apparatus 203. The print control data 503 includes compressed data obtained by compressing image data through a JPEG-compliant procedure, etc. Besides the compressed data, a print command is appended to the print control data 503, which is then input to the printing apparatus 203. As illustrated in FIG. 6B, the print control data 503 includes a printing parameter portion and a print data portion. Each portion comprises a command portion and a data portion. That is, the print control data 503 has a print command portion 605 that includes information indicating type of printing parameter, etc., a print parameter portion 606 such as a conversion table, a print command portion 607 that includes information indicating a pause command and a setting of print quality, and a print data portion 608 that includes compressed data.

Upon receiving the print control data 503, the printing apparatus 203 restores the compressed data to image data 505 by subjecting it to decode processing 504. The image processing module of the printing apparatus 203 applies color processing 506 to the image data 505, thereby generating CMYK multi-valued bitmap data 507. The graphics driver 214 applies quantization processing 508 to the CMYK multi-valued bitmap data 507, thereby generating print control data 509. The print control data 509 is subjected to print processing 510 by a print control module in the printing apparatus 203.

When data is converted by color processing and quantization processing in the computer 201 and printing apparatus 203, printing parameters are used. The printing parameters include conversion tables to which reference is had in order to convert data to CMYK data by color processing, and conversion tables to which reference is had in order to convert data to binary data by quantization processing. These conversion tables differ depending upon the type of printing medium and print quality. The number of printing parameters that include these conversion tables is equivalent to the number of combinations of types of printing medium and print qualities.

Among these printing parameters, some are being held within the printing apparatus 203 and some are being held within the printer driver installed in the computer. Owing to a limitation upon the memory capacity of the printing apparatus 203, the printing apparatus 203 cannot hold all printing parameters corresponding to all combinations of types of printing medium and print qualities. In a case where printing using printing parameters not held in the printing apparatus 203 is performed, it is required that the printing parameters necessary for printing be transmitted from the computer 201 to the printing apparatus 203 as the print parameter portion 606.

<Print Processing>

Figure 7:
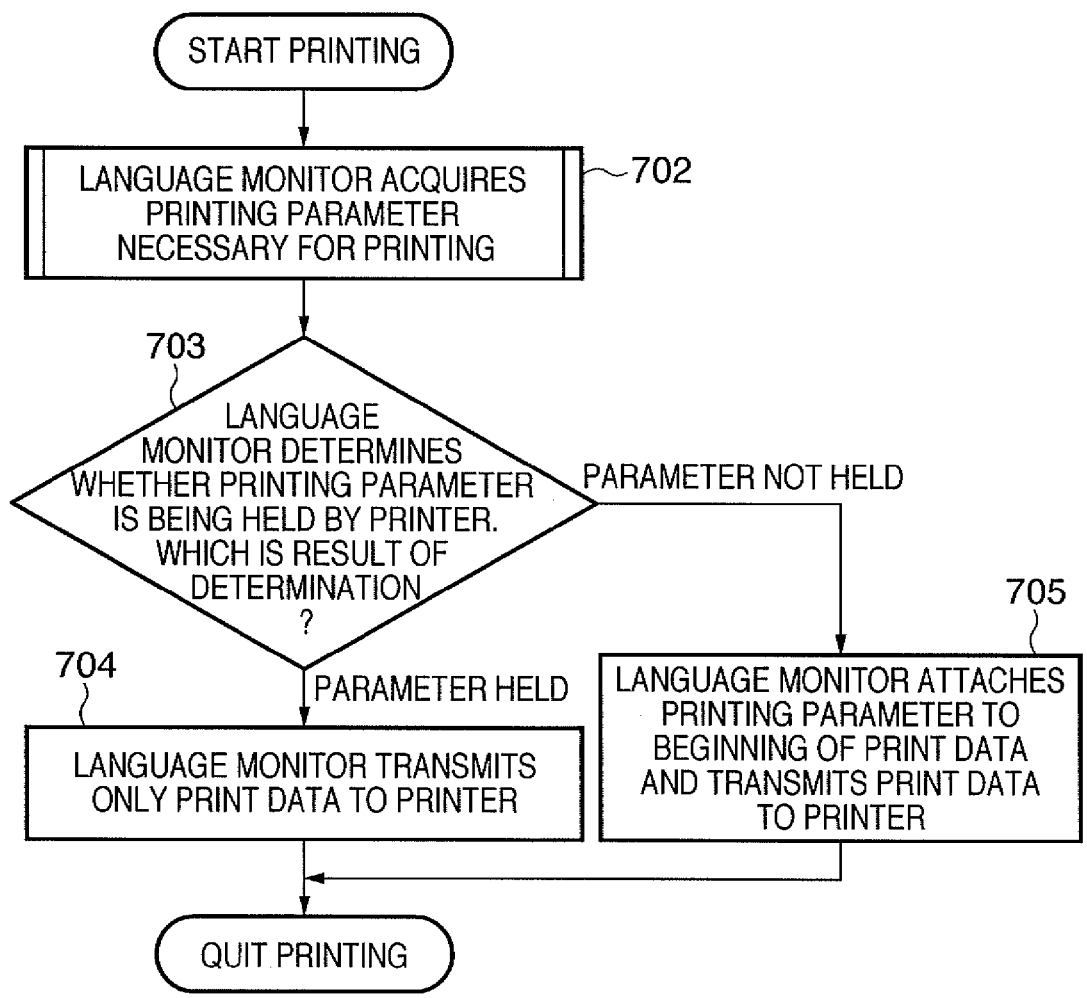
FIG. 7 is a flowchart illustrating processing for transmitting a printing parameter to a printing apparatus from an information processing apparatus in an embodiment of the present invention.

FIG. 7 is a diagram illustrating processing for transmitting a printing parameter from the computer 201 to the printing apparatus 203. The procedure of FIG. 7 starts in response to a print command that is input from the user via the application software 211, which is in the process of being executed. That is, when the application software 211 sends a graphic command to the operating system 212 in response to the print command from the user, the printer driver generates print data in accordance with the graphic command and delivers the print data to the language monitor 215. The delivered print data has a format the same as that of the print control data 503 shown in FIG. 6B. The print command portion is delivered first. In response, the language monitor 215 executes the processing shown in FIG. 7. The procedure of FIG. 7 is executed in a case where the printing apparatus 203 executes processing using a printing parameter, for example, processing for at least one among color conversion, color correction and quantization. Since the printer driver 213 has information indicating the kind of print data to be input to the printing apparatus 203, the printer driver 213 refers to this information and can determine whether the printing apparatus 203 will execute image processing using the printing parameter.

When print processing starts in response to the print command, the language monitor 215 acquires a printing parameter necessary for printing (702). That is, the language monitor 215 functions as a medium information acquisition unit, issues a medium detection request to the printing apparatus 203 and receives the response to the request. The response received is information indicating the type of printing medium (paper) loaded in the printing apparatus 203. A printing parameter specified by the information indicating the type of printing medium and a print quality that is either a default print quality or one that has been designated separately by the user is selected from a plurality of printing parameters that have been stored on the hard disk.

Next, the language monitor 215 determines whether the selected printing parameter is being held by the printing apparatus 203 (703). For example, if the identifier possessed by the printer driver 213 of the printing parameter selected at step 702 is included among identifiers of printing parameters being held by the printing apparatus 203, then it is determined that the selected printing parameter is being held by the printing apparatus 203.

If the determination made at step 703 is that the printing parameter necessary for printing is being held by the printing apparatus 203, then print control data to which the printing parameter has not been appended is transmitted to the printing apparatus 203 (704). If the printing parameter necessary for printing is not being held by the printing apparatus 203, then the language monitor 215 attaches the selected printing parameter to print control data (i.e., associates the selected printing parameter with the print control data) and transmits the result to the printing apparatus 203 (705). If the printing apparatus 203 has a function for caching the printing parameter, then the printer driver 213 stores the identifier of the printing parameter, which has been transmitted to the printing apparatus 203, as the identifier of the printing parameter being held by the printing apparatus 203. Since the content of the cache changes, in this case it is required that the identifier of the printing parameter cached by the printing apparatus 203 and the identifier of the printing parameter stored by the computer 201 be made to agree.

Thus, if the printing parameter necessary for printing is being held by the printing apparatus 203, the printing parameter is not transmitted from the computer, thereby enabling a reduction in the amount of data to be sent. This has the effect of suppressing any adverse effect upon printing speed.

The print control data transmitted to the printing apparatus 203 at step 705 is composed of the print command portions 605, 607, print parameter portion 606 and print data portion 608, as illustrated in FIG. 6B. A medium detection request (command to detect medium type) for designating detection of the type of printing medium is inserted into the print command portion 605 by the language monitor 215. The print parameter portion 606 is selected by the language monitor 215 and appended to the print control data. If print data received from the printer driver 213 via the spooler already includes the printing parameter appended by the printer driver, then this printing parameter is replaced. The print command portion 607 includes a paper feed command and a setting of print quality. The print data portion 608 includes data that is the result of compressing multi-valued image data. Upon receiving the print command portion 605, the language monitor 215 inserts the command of the medium detection request into the print command portion 605, transmits the result to the printing apparatus 203 and decides the printing parameter based upon the response. The printing parameter that has been received from the printer driver 213 is replaced by the decided printing parameter. Alternatively, if transmission of the printing parameter is unnecessary, the printing parameter received from the printer driver 213 is not transmitted. With regard to the print command portion 607 and print data portion 608, the received data is transferred to the printing apparatus 203 as is.

Figure 8:
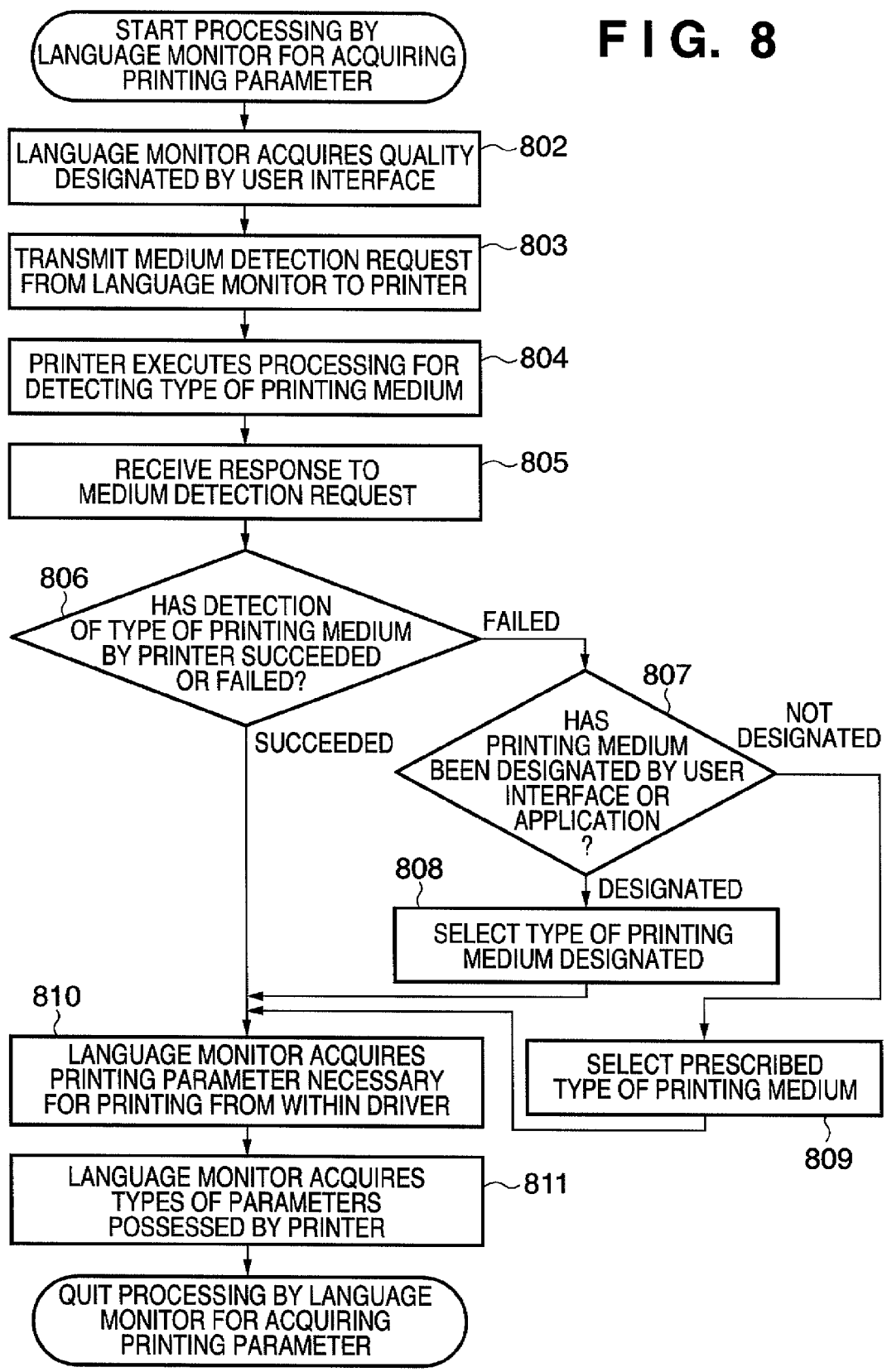
FIG. 8 is a flowchart illustrating processing whereby a language monitor acquires a printing parameter necessary for printing in an embodiment of the present invention.

FIG. 8 is a diagram illustrating processing whereby the language monitor 215 acquires a printing parameter necessary for printing. That is, the processing of FIG. 8 is executed at step 702 of FIG. 7. In the flowchart of FIG. 8, step 804 is processing executed by the printing apparatus 203.

When print data has been delivered to the language monitor 215, print quality information described in the header of the print data is acquired (802). Next, the language monitor 215 transmits the medium detection request (a command for designating detection of the printing medium) to the printing apparatus 203 (803). The printing apparatus 203 acquires the result of detection by the printing medium sensor in response to the request and sends information indicating the type of printing medium back to the language monitor 215 (804). If detection of the printing medium fails at this time, information indicating failure is sent back. The language monitor 215 receives the response to the medium detection request, namely information indicating the type of printing medium loaded, from the printing apparatus 203 (805). The language monitor 215 determines whether the received information is information indicating the type of printing medium or information indicating failure of detection (806). If detection succeeds and information indicating the type of printing medium is received, the language monitor 215 acquires the printing parameter corresponding to the acquired print quality and type of printing medium from among the printing parameters possessed by the printer driver 213 (810). Next, the language monitor 215 reads out the identifiers of printing parameters already being held in the printing apparatus 203 (811). It should be noted that the identifiers of printing parameters being held by the printing apparatus 203 may be acquired by querying the printing apparatus 203 on each occasion. The language monitor 215 decides the printing parameter used in printing from the thus acquired setting of print quality and type of printing parameter loaded.

If detection of the type of printing medium fails in step 806, on the other hand, then control branches to step 807. A reason for detection failure can be the occurrence of sensor malfunction or the presence of a printing medium that the printing apparatus 203 cannot identify. Upon receiving the response indicating detection failure, the language monitor 215 determines whether the type of printing medium has been designated via the application software 211 that created the print job or the user interface of the printer driver (807). If the result is that the printing medium has been designated, then the language monitor 215 selects the type of printing medium designated (808). If the printing medium has not been designated or if automatic detection has been selected, then the language monitor 215 selects the prescribed (default) printing medium (809). The prescribed (default) printing medium referred to here is, for example, the default printing medium of the printer driver, the same printing medium as that of the preceding job, or a printing medium that is input by the user in response to the viewer making the selection upon being prompted to do so by display of a selection screen. Control then proceeds to step 810.

It should be noted that the language monitor 215 accepts the printing parameter, which has been set by the user via the printer driver user interface, from the graphics driver 214 together with the print data. In the processing of FIG. 8, the language monitor 215 selects a printing parameter anew, ignoring the printing parameter received from the graphics driver 214, and appends the selected printing parameter to the print data. Accordingly, if it is determined at step 806 in FIG. 8 that detection of the type of printing medium has failed, the language monitor 215 may transmit the printing parameter received from the graphics driver 214 to the printing apparatus 203 as together with the print data without selecting a printing parameter anew.

FIG. 9 illustrates an example of a driver parameter table 901 in which printing parameters being held by the printer driver 213 are associated with printing qualities and types of printing media. FIG. 10 illustrates an example of a printer parameter table 902 in which printing parameters being held by the printing apparatus 203 are associated with printing qualities and types of printing media. For example, assume that a printing parameter ID=1 has been associated with a detected type of printing medium and a designated print quality. The language monitor 215 reads "1" from the driver parameter table 901 as the ID (identifier) of the corresponding printing parameter and determines whether the ID "1" exists in the printer parameter table 902. In the example of FIGS. 9 and 10, the printing parameter of ID "1" does not exist in the printer parameter table 902. The language monitor 215 therefore attaches the printing parameter to the beginning of the print data and then transmits the print data to the printing apparatus 203 (705).

Figure 11:
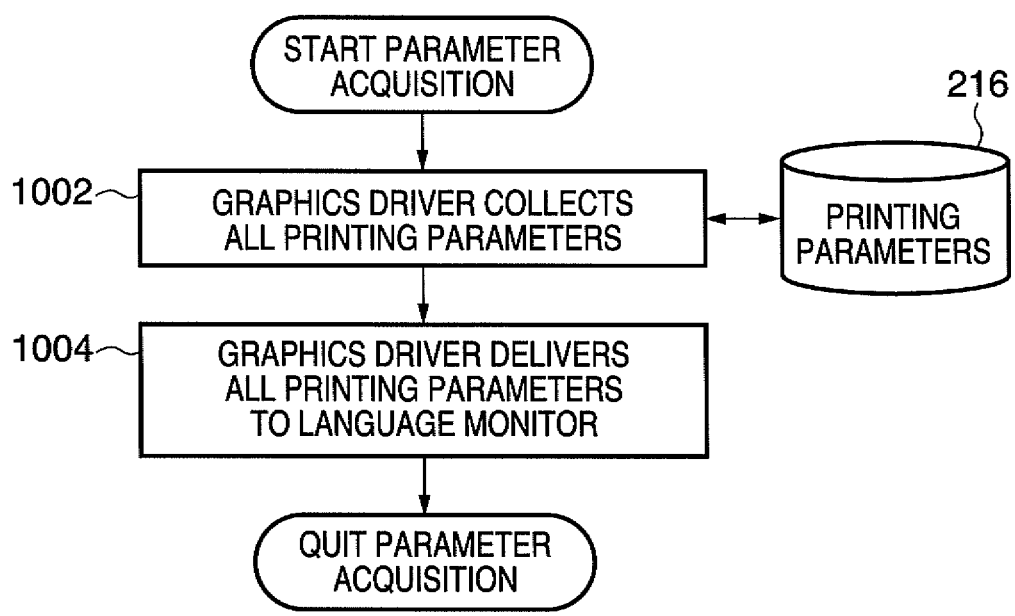
FIG. 11 is a flowchart illustrating processing whereby a driver module acquires a printing parameter in an embodiment of the present invention.

It should be noted that the procedure described in FIG. 8 is one in which the language monitor 215 acquires the printing parameter necessary for printing from a group of printing parameters possessed by the printer driver 213. The printing parameters (group) 216 may be collected dynamically. Such a procedure will be described with reference to FIG. 11. A module such as the graphics driver 214 upstream of the language monitor 215 collects all of the printing parameters 216 being held by the printer driver 213 (1002). All of the collected printing parameters 216 are then delivered to the language monitor 215 (1004). At the moment the type of printing parameter can be specified, the language monitor 215 selects the printing parameter suited to printing from among the printing parameters delivered. It is possible for the present invention to be implemented by this arrangement as well.

Further, there are cases where the printing parameters 315 being held within the printing apparatus 203 have been manipulated as by reducing the grid points in order to reduce the size of the printing parameters per se. In such cases there are instances where printing parameters for which there is a difference in the numbers of grid points in the tables and which correspond to the specific type of printing medium and specific print quality have been stored by respective ones of the computer 201 and printing apparatus 203. Further, in this case, an image printed using the printing parameter of the printer driver has a higher quality. Accordingly, at the decision step 703 at which it is determined whether the printing apparatus 203 holds the printing parameter selected by the language monitor 215, a determination for giving priority to print quality may be made. For example, consider a case where information indicating the type of printing medium acquired from the printing apparatus 203 is indicative of a printing medium for which a high quality is requested, and that a high quality has been selected as the print quality. In this case, whether or not the printing parameter selected by the language monitor 215 is being held within the printing apparatus 203 is ignored. The language monitor 215 transmits the selected printing parameter to the printing apparatus 203 even if this printing parameter is being held by the printing apparatus 203.

Thus, as set forth above, the language monitor 215 in this embodiment is capable of transmitting a printing parameter conforming to the type of printing medium actually loaded in the printing apparatus to the printing apparatus in association with print data. As a result, the printing apparatus is capable of executing image processing of high accuracy and can output a high-quality printout.

Further, processing of higher speed is made possible by performing a selection of a printing parameter not by a graphics driver but by a language monitor after print data has been de-spooled from a spool file.

[Second Embodiment]

Described next will be a language monitor with additional processing for a case where there is no printing parameter corresponding to the type of printing medium acquired from the printing apparatus 203 and the designated print quality. The structure of the apparatus in this embodiment is identical with that of the first embodiment.

Figure 12:
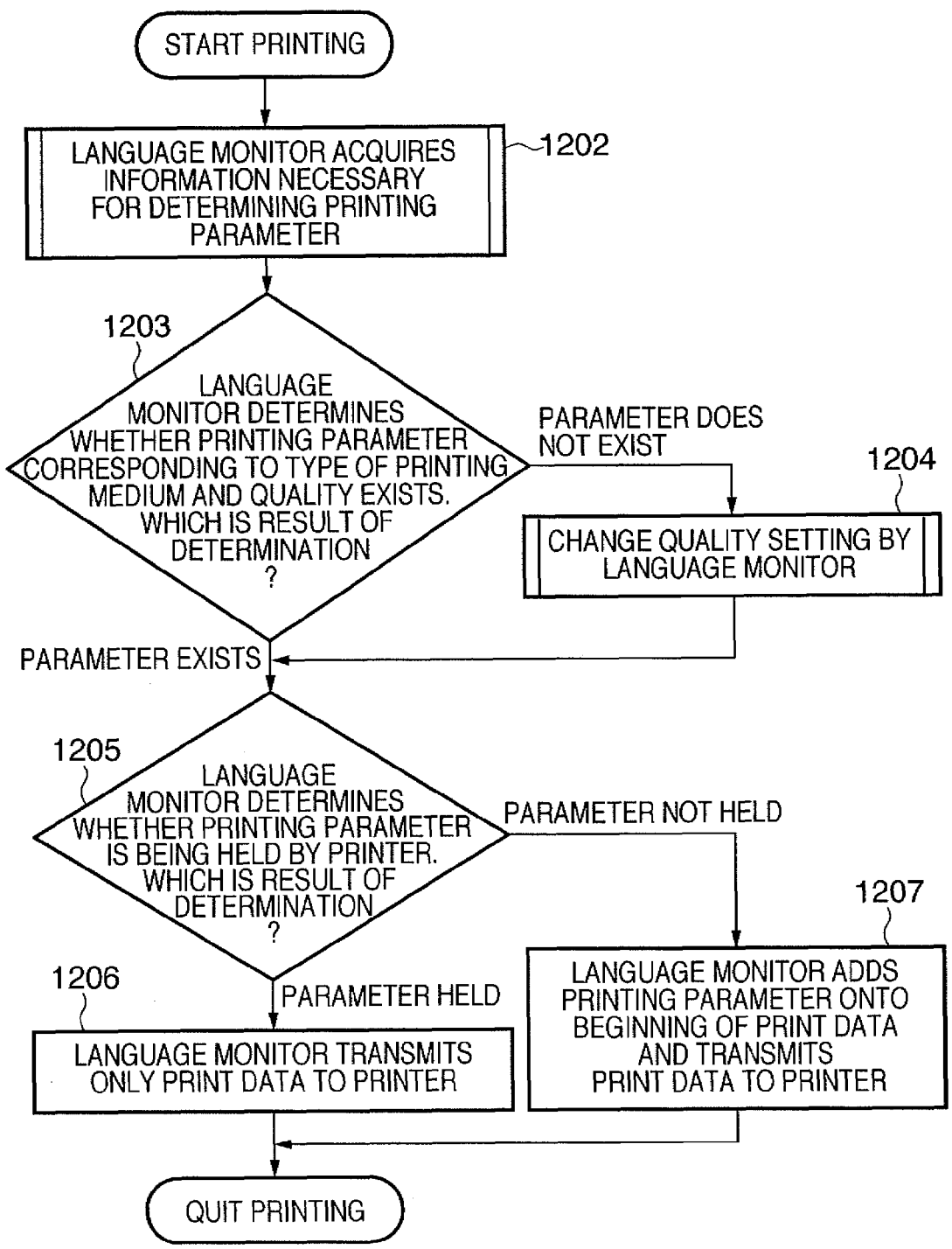
FIG. 12 is a flowchart illustrating processing in a case where a printing setting unit has selected a print quality that is not supported by the type of printing medium acquired from a printing apparatus in an embodiment of the present invention.

FIG. 12 is a flowchart illustrating the flow of processing in a case where there is no printing parameter corresponding to the type of printing medium acquired from the printing apparatus 203 and the designated print quality. FIG. 12 is substituted for FIG. 7 of the first embodiment. Print media include print media having a relationship between print quality and type of medium, such as coated paper that assumes the formation of an image of a high quality. In a case where there is such a correlation between type of printing medium and print quality, usually only a printing parameter corresponding to such a correlated type of printing medium and print quality is prepared. For example, if the type of printing medium is coated paper and the designated print quality is low quality, then there are instances where a printing parameter corresponding to such a setting will not have been prepared.

The language monitor 215 acquires information indicating the type of printing medium necessary for selection of the printing parameter and tries a selection of a printing parameter in accordance with this information and the designated print quality (1202). The language monitor 215 then determines whether this printing parameter exists (1203). If this printing parameter does not exist, then the language monitor 215 displays a setting screen prompting a change of the setting of print quality and prompts the user to make the setting again. Alternatively, the language monitor 215 changes the print quality and decides the printing parameter after the change of the setting of print quality (1204).

The processing from step 1205 onward is similar to that from step 703 onward, where step 703 in FIG. 3 is for determining whether the selected printing parameter is held within the printing apparatus 203.

Figure 13:
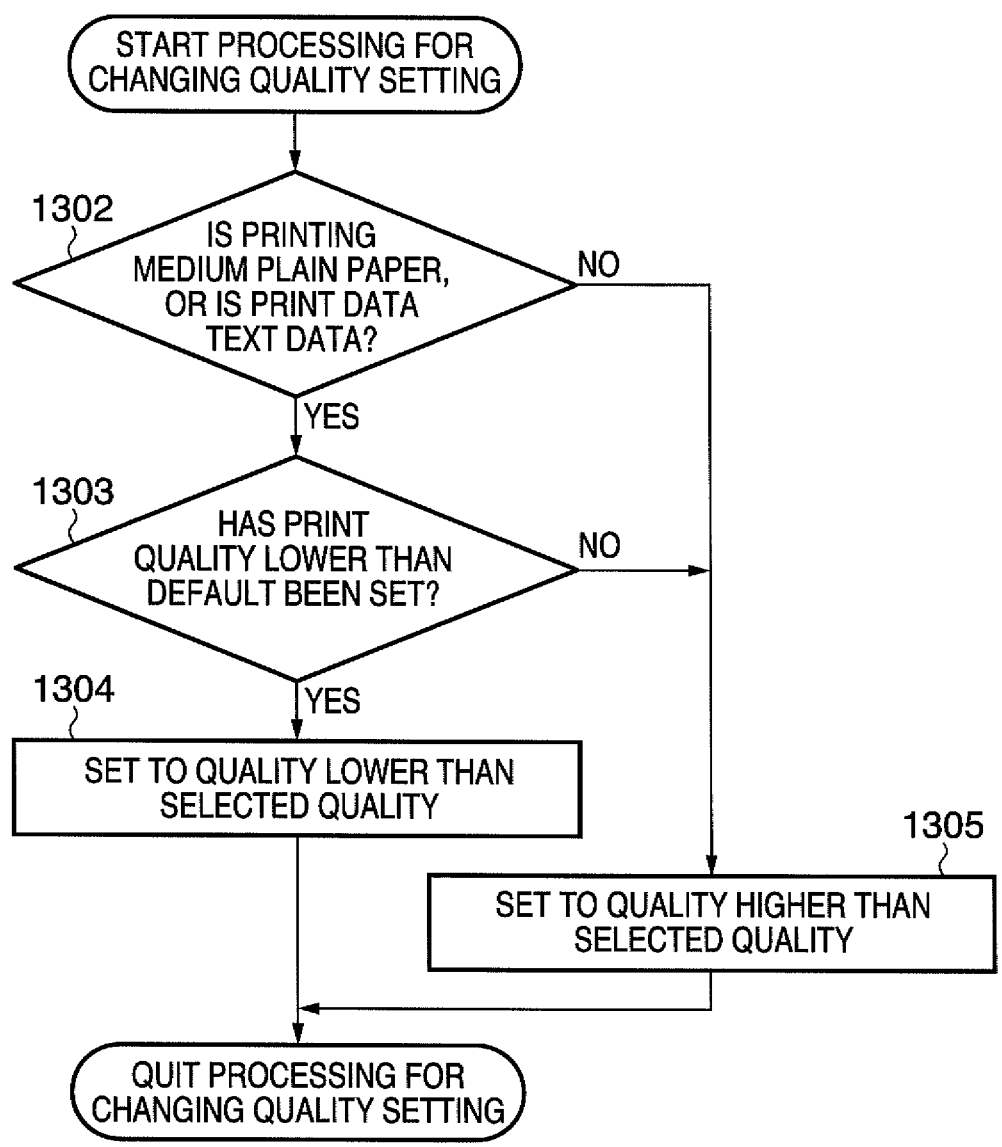
FIG. 13 is a flowchart illustrating for changing a setting of print quality automatically at a step 704 in an embodiment of the present invention.

An example of the processing of step 1204 for changing the setting of print quality will be described with reference to FIG. 13. It is determined whether the detected printing medium is plain paper or whether the print data is print data having a great deal of text (1302). If either of these is the case, it is determined whether a print quality lower than the default print quality has been designated (1303). If a print quality lower than the default print quality has been designated, then the print quality is set to a print quality lower than the designated print quality (1304). On the other hand, if it is found at step 1303 that a print quality higher than the default print quality has been designated, then the setting of print quality is changed to a higher print quality (1305). Of course, it is required that the re-designated print quality be such that a printing parameter corresponding to this print quality and detected type of printing medium exists.

If the printing medium detected at step 1302 is other than plain paper, or if the print data has many images, then the setting of print quality is changed to a print quality higher than the designated print quality.

In a case where there is no lower or higher print quality in the above-described processing for changing print quality, then a change is made to a print quality on the respective opposite side (i.e., from a low to a high or from a high to a low print quality).

By adopting the arrangement described again, a print quality and printing parameter suited to the type of printing medium actually loaded can be selected. This makes it possible to form an image of higher quality.

[Third Embodiment]

Figure 14:
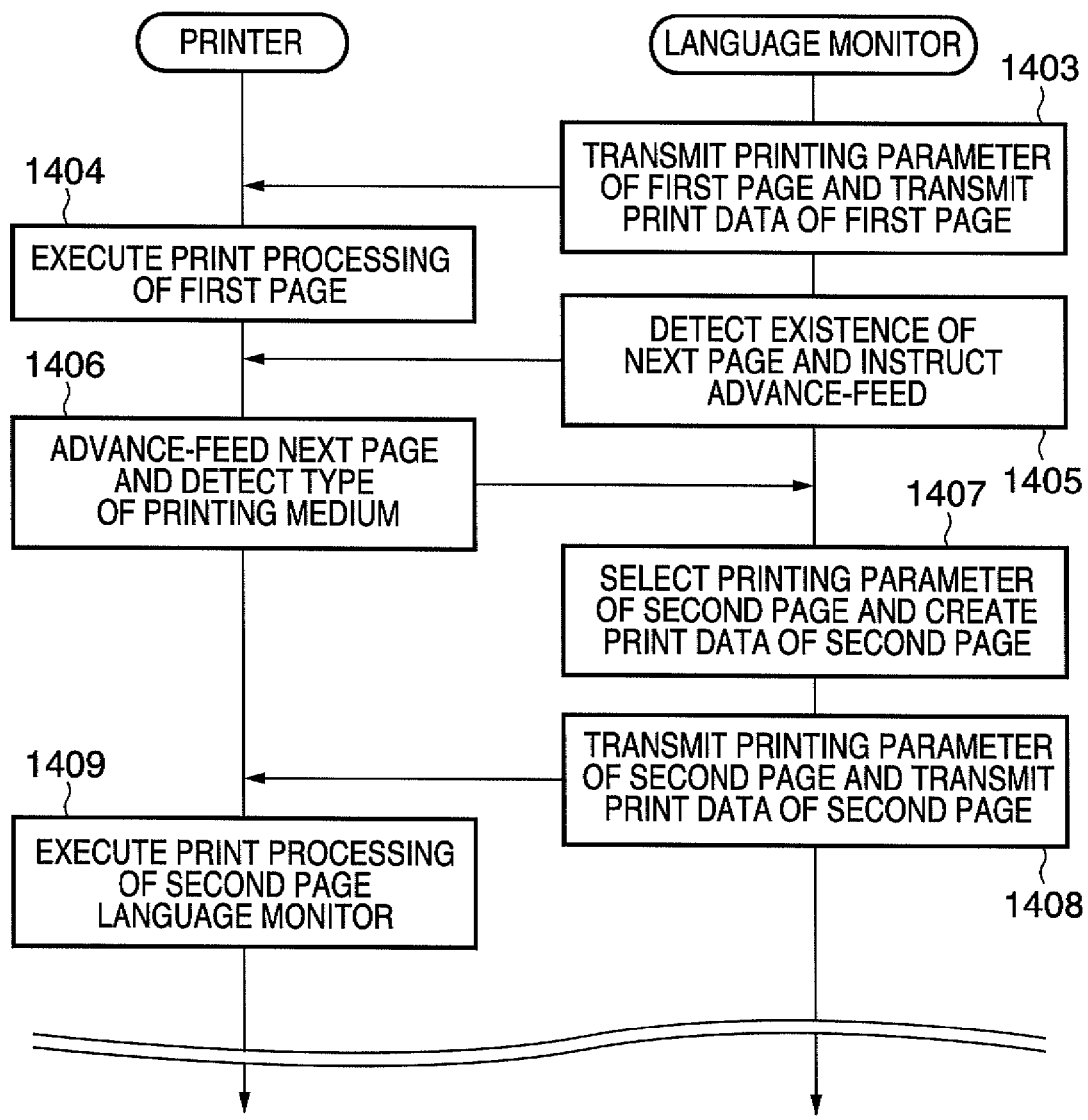
FIG. 14 is a flowchart illustrating processing in a case where type of paper differs from one page to another among a plurality of pages in an embodiment of the present invention.

Reference will be had to FIG. 14 to describe an example of processing in a case where the type of paper differs from one page to another among a plurality of pages.

The structure of the apparatus in this embodiment is identical with that of the first embodiment.

First, the printing parameter and print data of the first page are transmitted to the printing apparatus 203 (1403). The printing apparatus 203 starts print processing of the first page (1404). When the existence of the next page is sensed, the language monitor 215 instructs the printing apparatus 203 to feed the next sheet of the printing medium (1405). When printing of the first page is completed to a certain extent, the printing apparatus 203 receives the paper-feed command, feeds the second page and notifies the language monitor 215 of detection of the type of printing medium at step 1406. By way of example, the "certain extent" mentioned above may be such as to assure a clearance between sheets of the printing medium that will prevent the sheets from overlapping. When the type of printing medium of the second page is clarified, the language monitor 215 selects a printing parameter used by the second page, attaches the printing parameter to the beginning of the print data (1407) and transmits the printing parameter and print data of the second page to the printing apparatus 203 (1408). In a case where the printing parameter of the second page is similar to that of the first page, transmission of the printing parameter can be omitted. At this time notification of the fact that the printing parameter of the second page is similar to the printing parameter of the first page is given. The printing apparatus 203 converts the data of the second page using the same printing parameter as that of the first page.

By thus sensing the type of printing medium of a succeeding page during the printing of the preceding page, it is possible to change over the printing parameter without stopping printing between pages.

Further, although the type of printing medium is sensed page by page with the arrangement described in FIG. 14, implementation is also possible with an arrangement in which the type of printing medium is sensed at a fixed timing. "Fixed timing" refers to a timing at which an "out of paper" error is eliminated by replenishing paper after the occurrence of this error, or a timing at which a paper-feed port is changed in a machine model having a plurality of paper-feed ports, etc.

Even in a case where a printing medium is changed for another during execution of a single print job in the above-described procedure, a printing parameter suited to the type of printing medium after the change can be selected and a high-quality image can be output.

[Fourth Embodiment]

Figure 15:
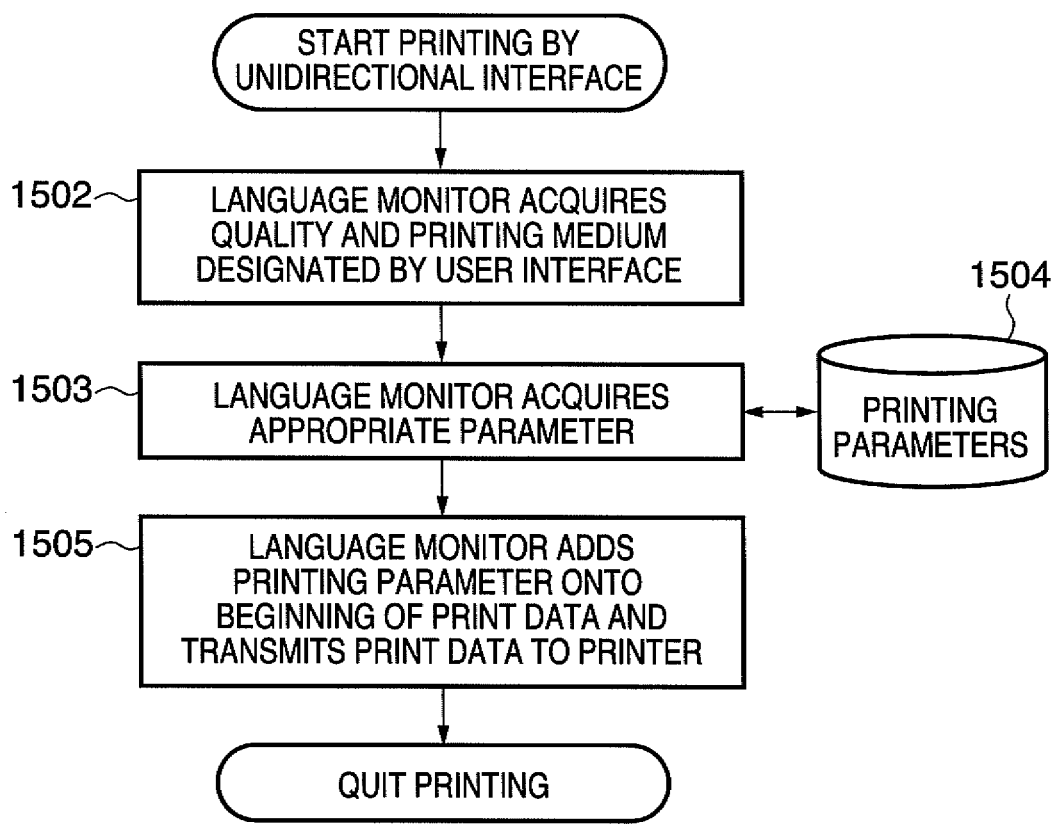
FIG. 15 is a flowchart illustrating processing in a case where a unidirectional interface is connected and printing performed in an embodiment of the present invention.

Next, reference will be had to FIG. 15 to describe an example of processing in a case where the computer 201 is connected to the printing apparatus 203 by an interface (referred to as a "unidirectional interface" below) that is incapable of acquiring information from the printing apparatus 203. The structure of the apparatus is similar to that of the first embodiment with the exception of the fact that the interface between the printing apparatus and computer is unidirectional (down direction only).

Upon determining that the connection has been made via the unidirectional interface, the printing setting unit arranges it so that an "automatic" setting cannot be selected by the item for setting the type of printing medium. The "automatic" setting is a setting for detecting the type of printing medium by the printing apparatus 203. In this embodiment, therefore, a print job issued from the computer 201 is placed in a state in which a specific type of printing medium has been selected by the printing setting unit. If such a print job is accepted by the language monitor 215, the latter acquires the print quality and type of printing medium set by the printing setting unit (1502). The language monitor 215 acquires a printing parameter 1504 corresponding to the print quality and type of printing medium acquired (1503). Next, the language monitor 215 attaches the acquired printing parameter to the beginning of the print data and transmits the result to the printing apparatus 203 (1505).

[Other Embodiments]

Described next will be a case where print data is sent from the printer driver to the printing apparatus 203 without attaching a printing parameter to the data.

In a case where print data without an attached printing parameter has been transmitted to a printing apparatus that does not hold the printing parameter, the printing apparatus selects the nearest printing parameter from printing parameters that are held within the apparatus and then converts the data. The nearest printing parameter may be one decided in advance, by way of example.

In a case where the printing medium is of a high-grade type (this also may be decided in advance), printing may be halted and a warning giving guidance about performing printing again may be issued. Alternatively, implementation is possible with a method in which printing is aborted and the print job discarded.

By way of example, in a case where bi-directional support is not made effective with Windows (registered trademark) settings, there are instances where a printing parameter cannot be transmitted from the printer driver. This is a problem in an arrangement in which a parameter is appended by the language monitor, as in the first embodiment. However, in a case where bi-directional support has not been made effective, it is possible to avoid the problem by adopting specifications in which the printing parameter is added on by another driver module.

Whether optimization of an image is performed by appending a printing parameter to print data and sending the print data from the computer to the printing apparatus 203 varies depending upon the setting environment of the printer driver user interface or the configuration environment such as a difference in the interface connecting the computer and the printing apparatus 203.

Figure 16:
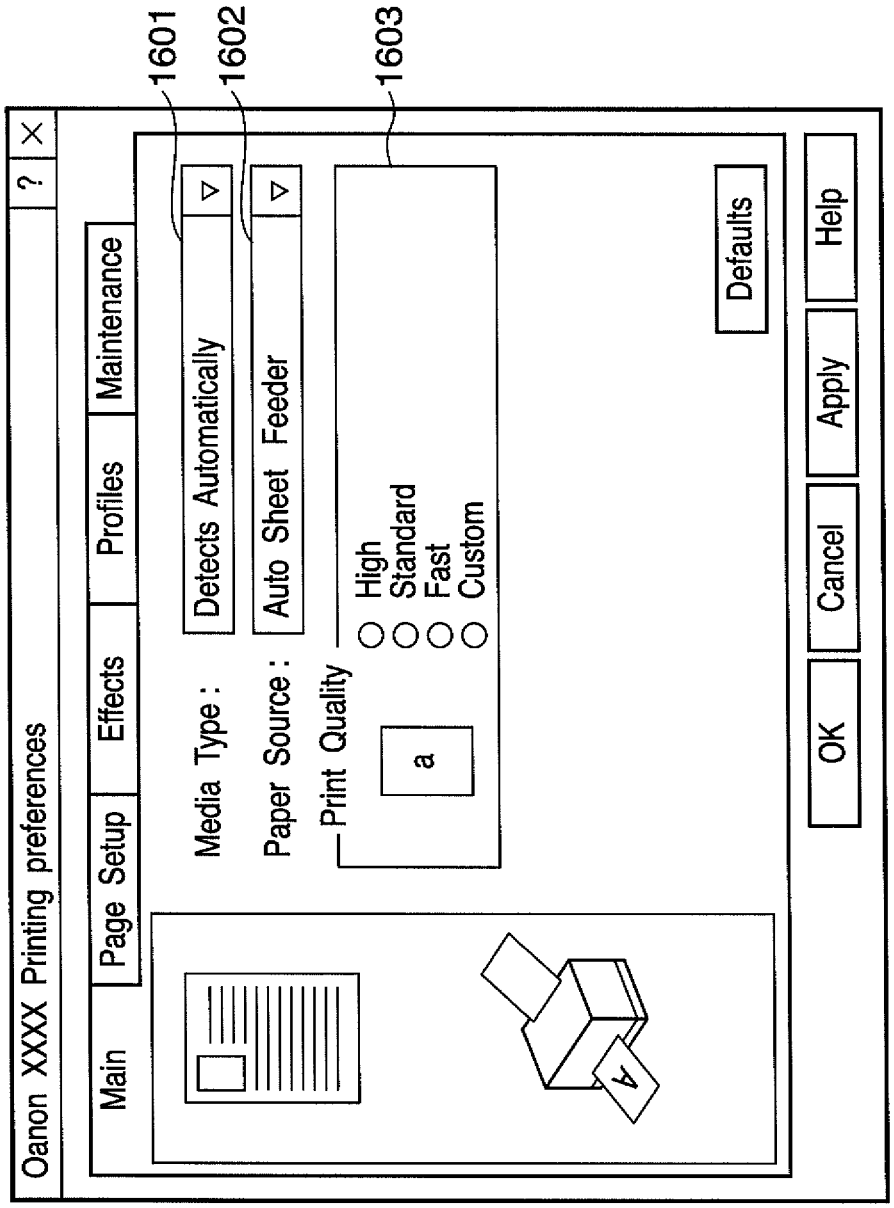
FIG. 16 is a diagram illustrating a printing setting unit of a printing control apparatus in an embodiment of the present invention.

For example, in a case where a setting detected by the printing apparatus 203 has been selected by a portion 1601 for selecting the type of printing medium on a printer driver user interface of the kind shown in FIG. 16, a printing parameter is transmitted from the computer to the printing apparatus 203. If the printing medium has been designated, a printing parameter held within the printing apparatus 203 is used. The present invention can be implemented with this arrangement as well.

Further, in a case where a paper-feed port not equipped with a mechanism for detecting the type of printing medium has been selected at a portion 1602 for selecting the paper-feed port on the printer driver user interface, a printing parameter is always transmitted from the computer to the printing apparatus 203. The present invention can be implemented with this arrangement as well.

Further, in a case where a setting giving priority to speed over image quality has been made at a portion 1603 for setting print quality on the printer driver user interface, a printing parameter held within the printing apparatus 203 is used. The present invention can be implemented with this arrangement as well.

Further, in a case where the type of application that has created print data or the content of print data delivered from an application is determined and an image printed, a printing parameter in the computer is used. In a case where text is printed, a printing parameter in the printing apparatus 203 is used. The present invention can be implemented with this arrangement as well.

The description rendered above is premised on a case where a printing parameter held by the printing apparatus 203 is fixed. For example, if a printing parameter that was used the last time printing was performed is being held by the printing apparatus 203, the printing parameter that was used the last time printing was performed is stored in the computer by the language monitor. If a selected printing parameter and the stored printing parameter are the same, it is not necessary to transmit the printing parameter to the printing apparatus 203. If such an arrangement is adopted, the type of printing parameter being held by the printing apparatus need not be acquired from the printing apparatus.

Thus, although various specifications in which the printing apparatus 203 remembers printing parameters are conceivable, it is possible to construct the optimum printing system by having the language monitor deal with all of these.

The object of the present invention can be attained by supplying a program (printer driver) of software for implementing the functions of the foregoing embodiments to a computer or CPU, and having the computer or CPU read out and execute the program supplied. In this case, the program is supplied directly from a storage medium or is supplied by being downloaded from another computer or database (not shown) connected to the Internet, a commercial network or local-area network, etc.

Implementation is possible even if the form of the program is object code, program code executed by an interpreter or script data supplied to the operating system.

Further, the present invention can be achieved by supplying a computer or CPU with a storage medium storing software for implementing the functions of the embodiments, and having the computer of CPU read out and execute the program stored on the storage medium.

In this case, the program code per se read out of the storage medium implements the functions of the foregoing embodiments, and the storage medium storing this program code constitutes the present invention.

Examples of storage media for storing program code are a ROM, RAM, NV-RAM, floppy (registered trademark) disk, hard disk, optical disk and magneto-optical disk. Optical disks include a CD-ROM, MO, CD-R, CD-RW, DVD-ROM, DVD-RAM, DVD-RW and DVD+RW. Other media are a magnetic tape and non-volatile memory card, etc.

Besides the case where the aforesaid functions according to the embodiments are implemented by executing program code read out of a computer, the functions can be implemented by having an operating system or the like running on the computer execute some or all of the actual processing based upon the commands of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-18500, filed Jan. 29, 2007, which is hereby incorporated by reference herein in its entirety.

What is claimed is:

1. A host computer connected to a printing apparatus having a unit for sending medium information indicating a type of a printing medium acquired in response to a medium type acquisition request from the host computer, and a unit for generating binary print data using a printing parameter that has been associated with multi-valued print data that has been received, and performing printing based upon the binary print data generated, said host computer comprising:

a storage unit configured to store a plurality of printing parameters conforming to types of printing media;

a reception unit configured to receive medium information indicative of a type of printing medium from the printing apparatus;

an acquisition unit configured to acquire a printing parameter from the storage unit, wherein the printing parameter is associated with the medium information received by the reception unit; and a transmission unit configured to determine whether the printing apparatus holds the printing parameter acquired by the acquisition unit, wherein the transmission unit transmits multi valued print data and the printing parameter which is acquired by the acquisition unit to the printing apparatus in a case where it is determined that the printing parameter is not held by the printing apparatus, wherein the transmission unit transmits the multi valued print data without the printing parameter to the printing apparatus in a case where it is determined that the printing parameter is held by the printing apparatus, wherein said storage unit further stores information indicating printing parameters being held by the printing apparatus, and said transmission unit refers to the information indicating the printing parameters and, if a selected printing parameter corresponds to a printing parameter being held by the printing apparatus, transmits the print data to the printing apparatus without this printing parameter, and wherein said transmission unit transmits the selected printing parameter to the printing apparatus in association with the multi-valued print data even when a printing parameter corresponding to the selected printing parameter is held by the printing apparatus, if the type of printing medium received from the printing apparatus is indicative of a printing medium for which a high quality is requested and a high quality has been selected as the print quality.

2. The host computer according to claim 1, wherein said storage unit stores a plurality of printing parameters conforming also to print qualities in addition to types of printing media; and the acquisition unit selects a printing parameter, which conforms also to a designated print quality in addition to the type of printing medium indicated by the medium information, from the plurality of printing parameters that have been stored in said storage unit.

3. The host computer according to claim 1, wherein in a case where the medium information could not be received, the acquisition unit selects a printing parameter conforming to a default type of printing medium from the plurality of printing parameters that have been stored in said storage unit.

4. The host computer according to claim 1, wherein the printing parameters include at least one among a first color correction table for applying a color correction to first image data, a color conversion table for converting the colorimetric system of the first image data to obtain second image data, a second color correction table for applying a color correction to the second image data, and a quantization table for quantizing the second image data.

5. The host computer according to claim 1, wherein when existence of print data of a succeeding page is sensed, the type information indicating the type of printing medium is acquired by issuing a command for feeding the printing medium in advance.

6. A non-transitory computer-readable storage medium on which has been stored a program for causing a computer to function as the units with which the host computer set forth in claim 1 is provided.

7. A method of controlling a host computer connected to a printing apparatus having a unit for sending medium information indicating a type of a printing medium acquired in response to a medium type acquisition request from the host computer, and a unit for generating binary print data using a printing parameter that has been associated with multi-valued print data that has been received, and performing printing based upon the binary print data generated, wherein the host computer has a storage unit for storing a plurality of printing parameters conforming to types of printing media, said method comprising:

a reception step of receiving medium information indicative of a type of printing medium from the printing apparatus;

an acquisition step of acquiring a printing parameter from the storage unit, wherein the printing parameter is associated with the medium information received in the reception step;

a determining step of determining whether the printing apparatus holds the printing parameter acquired in the acquisition step; and a transmission step of transmitting multi valued print data and the printing parameter which is acquired in the acquisition step to the printing apparatus in a case where it is determined that the printing parameter is not held by the printing apparatus, and transmitting the multi valued print data without the printing parameter to the printing apparatus in a case where it is determined that the printing parameter is held by the printing apparatus, wherein said storage unit further stores information indicating printing parameters being held by the printing apparatus, and at said determining step, reference is had to the information indicating the printing parameters and, if a selected printing parameter corresponds to a printing parameter being held by the printing apparatus, the print data is transmitted to the printing apparatus without this printing parameter, and wherein in the transmission step, the selected printing parameter is transmitted to the printing apparatus in association with the multi-valued print data even when a printing parameter corresponding to the selected printing parameter is held by the printing apparatus, if the type of printing medium received from the printing apparatus is indicative of a printing medium for which a high quality is requested and a high quality has been selected as the print quality.

8. The method according to claim 7, wherein said storage unit stores a plurality of printing parameters conforming also to print qualities in addition to types of printing media; and at said acquisition step, a printing parameter, which conforms also to a designated print quality in addition to the type of printing medium indicated by the medium information, is selected from the plurality of printing parameters that have been stored in said storage unit.

9. The method according to claim 7, wherein in a case where the medium information could not be received, a printing parameter conforming to a default type of printing medium is selected from the plurality of printing parameters that have been stored in said storage unit.

10. The method according to claim 7, wherein the printing parameters include at least one among a first color correction table for applying a color correction to first image data, a color conversion table for converting the colorimetric system of the first image data to obtain second image data, a second color correction table for applying a color correction to the second image data, and a quantization table for quantizing the second image data.

11. The method according to claim 7, wherein when existence of print data of a succeeding page is sensed, the type information indicating the type of printing medium is received by issuing a command for feeding the printing medium in advance.

12. A printing control system comprising a host computer and a printing apparatus, wherein said printing apparatus comprises:
   a notification unit configured to send medium information indicating a type of a printing medium in response to a medium type request from said host computer; and
   a printing unit configured to generate binary print data using a printing parameter that has been associated with multi-valued print data that has been received, and to perform printing based upon the binary print data generated; and
said host computer comprises:
   a storage unit, configured to store a plurality of printing parameters conforming to types of printing media;
   a reception unit configured to request the medium type from the printing apparatus to receive medium information indicative of a type of printing medium from the printing apparatus;
   an acquisition unit configured to acquire a printing parameter from the storage unit, wherein the printing parameter is associated with the medium information received by the reception unit; and
   a transmission unit configured to determine whether the printing apparatus holds the printing parameter acquired by the acquisition unit,
wherein the transmission unit transmits multi valued print data and the printing parameter which is acquired by the acquisition unit to the printing apparatus in a case where it is determined that the printing parameter is not held by the printing apparatus,
wherein the transmission unit transmits the multi valued print data without the printing parameter to the printing apparatus in a case where it is determined that the printing parameter is held by the printing apparatus,
wherein said storage unit further stores information indicating printing parameters being held by the printing apparatus, and
said transmission unit refers to the information indicating the printing parameters and, if a selected printing parameter corresponds to a printing parameter being held by the printing apparatus, transmits the print data to the printing apparatus without this printing parameter, and
wherein said transmission unit transmits the selected printing parameter to the printing apparatus in association with the multi-valued print data even when a printing parameter corresponding to the selected printing parameter is held by the printing apparatus, if the type of printing medium received from the printing apparatus is indicative of a printing medium for which a high quality is requested and a high quality has been selected as the print quality.

* * * * *